United States Patent
Endo et al.

(10) Patent No.: US 9,735,653 B2
(45) Date of Patent: Aug. 15, 2017

(54) ROTARY ELECTRIC DEVICE FOR POWER WORKING MACHINE

(71) Applicants: TOYO DENSO CO., LTD., Minato-Ku, Tokyo (JP); HONDA MOTOR CO., LTD., Minato-Ku, Tokyo (JP)

(72) Inventors: Takehiko Endo, Tsurugashima (JP); Naoaki Shimizu, Tsurugashima (JP); Satoshi Yanoi, Tsurugashima (JP); Masaki Takahashi, Wako (JP); Yoshihiko Yamagishi, Wako (JP)

(73) Assignees: Toyo Denso Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 14/856,826

(22) Filed: Sep. 17, 2015

(65) Prior Publication Data
US 2016/0087510 A1    Mar. 24, 2016

(30) Foreign Application Priority Data
Sep. 18, 2014    (JP) .................................. 2014-190430

(51) Int. Cl.
*H02K 1/32*    (2006.01)
*H02K 9/06*    (2006.01)
(Continued)

(52) U.S. Cl.
CPC ........... *H02K 9/06* (2013.01); *A01D 34/6812* (2013.01); *H02K 1/32* (2013.01); *H02K 7/102* (2013.01);
(Continued)

(58) Field of Classification Search
CPC .. H02K 9/06; H02K 9/18; H02K 1/20; H02K 7/1815; H02K 7/102; A01D 34/6812
See application file for complete search history.

(56) References Cited

U.S. PATENT DOCUMENTS 6,333,579 B1    12/2001  Hirano et al.
6,384,494 B1 *  5/2002   Avidano ................... H02K 9/06
                                              310/58
(Continued)

FOREIGN PATENT DOCUMENTS

DE    10015947 A1    10/2000
JP    S63156415 U    10/1988
(Continued)

OTHER PUBLICATIONS

Official Communication dated Jan. 25, 2016 for corresponding European Patent Application No. EP 15 18 5431.

*Primary Examiner* — Dang Le
(74) *Attorney, Agent, or Firm* — Carrier Blackman & Associates, P.C.; William D. Blackman; Jingli Wang (57) ABSTRACT

In a rotary electric device for a power working machine capable of being braked by a brake mechanism, a cover having a bottomed cylindrical shape and covering a yoke of the device, includes: a cover cylindrical portion concentrically surrounding an outer peripheral surface of a cylindrical portion of the yoke with an annular clearance therebetween, and having an outer peripheral surface with which a brake shoe is capable of being placed in pressure contact; and a cover bottom wall portion continuous to one end of the cover cylindrical portion, and connected to a bottom wall portion of the yoke. A ventilation clearance communicating with the annular clearance is formed between the bottom wall portion and the cover bottom wall portion. Vent holes communicating the ventilation clearance with an outside of the yoke are provided through the bottom wall portion and the cover bottom wall portion.

8 Claims, 4 Drawing Sheets

(51) Int. Cl.
    *A01D 34/68*         (2006.01)
    *H02K 21/22*        (2006.01)
    *H02K 7/102*        (2006.01)
    *H02K 1/30*          (2006.01)
    *H02K 7/02*          (2006.01)
    *H02K 7/18*          (2006.01)

(52) U.S. Cl.
    CPC ............. *H02K 21/222* (2013.01); *H02K 1/30* (2013.01); *H02K 7/02* (2013.01); *H02K 7/1815* (2013.01)

(56) References Cited

U.S. PATENT DOCUMENTS

7,122,923 B2 *   10/2006   Lafontaine ............. H02K 1/187
                                                                        310/58
2015/0069868 A1 *   3/2015   Ricketts ................ H02K 7/102
                                                                        310/77

FOREIGN PATENT DOCUMENTS

JP         2005-282552 A     10/2005
WO        2014126017 A1     8/2014

* cited by examiner

FIG.4A
ASSEMBLED STATE OF ROTOR UNIT

FIG.4B
DISASSEMBLED STATE OF ROTOR UNIT

ROTARY ELECTRIC DEVICE FOR POWER WORKING MACHINE

BACKGROUND OF THE INVENTION

Field of the Invention

The present invention relates to a rotary electric device for a power working machine, which is operatively connected to an engine as a power source for the power working machine such as a power mower and the like, and capable of being braked by a brake mechanism.

Description of the Related Art

As disclosed in, for example, Japanese Patent Application Laid-open No. 2005-282552, a technique has been known in which a brake shoe of a brake mechanism is placed in pressure contact with functional components, such as a flywheel and the like, which are operatively connected to the engine capable of driving a cutting blade, so that a crankshaft of the engine can be braked.

In the power working machine as described above, in a case where as an object to be braked by the brake mechanism, for example, a rotor of a rotary electric device, particularly, a yoke having a bottomed cylindrical shape, is selected in place of the flywheel, the brake shoe of the brake mechanism is placed in pressure contact with an outer peripheral surface of a cylindrical portion of the yoke. In this case, if the temperature of the yoke serving also as a brake drum is increased by frictional heat during braking operation, or the yoke is distorted or deformed due to braking load, problems such as deterioration in performance of the rotary electric device, damage to magnets, decrease in connection strength, and the like, may occur. Furthermore, if the temperature of the yoke as the brake drum becomes high due to heat generated from coils, the magnets and the like when the rotary electric device is operated, brake performance may deteriorate.

Examples of conceivable measures to counter the problems include: providing, between an inner periphery of the yoke and the magnets, a protection cover for preventing the magnets from being damaged and coming off; and increasing a thickness of the yoke itself so as to reinforce rigidity thereof and so as to hardly transmit heat thereto. However, both examples invite increase in manufacturing costs. Particularly, in the case of increasing the thickness of the yoke, there are problems such as increase in the weight of the yoke, accordingly increase in costs and deterioration in fuel efficiency, increase in inertial mass of the engine, and the like.

SUMMARY OF THE INVENTION

The present invention has been made with the foregoing situations taken into consideration. An object of the present invention is to provide a rotary electric device for a power working machine which is capable of simultaneously solving the foregoing problems using a simple structure.

In order to achieve the object, according to a first aspect of the present invention, there is provided a rotary electric device for a power working machine, which is operatively connected to an engine as a power source for the power working machine, and capable of being braked by a brake mechanism, the rotary electric device comprising: a stator fixed to an engine main body; a yoke including a bottom wall portion and a cylindrical portion which surrounds the stator, the yoke being formed in a bottomed cylindrical shape by connecting the bottom wall portion to one end of the cylindrical portion, and the yoke being connected to a crankshaft of the engine; a magnet fixedly attached to an inner peripheral surface of the cylindrical portion of the yoke, and facing the stator; and a cover having a bottomed cylindrical shape, and covering the yoke, wherein the cover includes a cover cylindrical portion concentrically surrounding an outer peripheral surface of the cylindrical portion of the yoke with an annular clearance interposed therebetween, and having an outer peripheral surface with which a brake shoe of the brake mechanism is capable of being placed in pressure contact, and a cover bottom wall portion continuous to one end of the cover cylindrical portion, and connected to the bottom wall portion of the yoke, a ventilation clearance communicating with the annular clearance is formed between the bottom wall portion of the yoke and the cover bottom wall portion, and vent holes communicating the ventilation clearance with an outside of the yoke are provided through the bottom wall portion of the yoke and the cover bottom wall portion.

According to the first aspect of the present invention, the rotary electric device for a power working machine, which is capable of being braked by the brake mechanism, is configured as follows. The yoke connected to the crankshaft of the engine is covered with the cover having a bottomed cylindrical shape. The cover includes: the cover cylindrical portion concentrically surrounding the outer peripheral surface of the cylindrical portion of the yoke with the annular clearance interposed therebetween, and having the outer peripheral surface with which the brake shoe is capable of being placed in pressure contact; and the cover bottom wall portion continuous to the one end of the cover cylindrical portion, and connected to the bottom wall portion of the yoke. The ventilation clearance communicating with the annular clearance is formed between the bottom wall portion of the yoke and the cover bottom wall portion. The vent holes communicating the ventilation clearance with the outside of the yoke are provided through the bottom wall portion of the yoke and the cover bottom wall portion. For these reasons, even when the temperature of the cover which functions as the brake drum is increased by friction during braking operation, or the cover is deformed due to braking load, influence of the heat and deformation on the yoke can be effectively inhibited, and deterioration in performance of the rotary electric device can be prevented. In addition, even if the temperature of the yoke becomes high due to heat generated from coils, the magnet and the like when the rotary electric device is operated, the heat is hardly transmitted to the cover. For this reason, deterioration in brake performance due to the operation heat of the rotary electric device can be prevented. Furthermore, cooling air can be made to flow to: the clearances (the annular clearance and the ventilation clearance) formed between the yoke and the cover; and the vent holes provided through the bottom wall portion of the yoke and the bottom wall portion of the cover. In addition, surface areas of the yoke and the cover can be sufficiently secured as a whole. For these reasons, the yoke and the cover can be effectively cooled. Thereby, it is unnecessary to, for example, especially provide a magnet protection cover between an inner periphery of the yoke and the magnet and especially thicken the yoke itself. It is possible to contribute to: cost reduction; reduction in the weight of rotary portions of the rotary electric device; and accordingly reduction in fuel consumption of the engine and reduction in inertial mass of the engine.

According to a second aspect of the present invention, in addition to the first aspect, a cooling fan for making cooling air forcedly flow in the annular clearance, the ventilation clearance and the vent holes is connected to an outer surface of the cover bottom wall portion.

According to the second aspect of the present invention, the cooling fan for making the cooling air forcedly flow in the annular clearance, the ventilation clearance and the vent holes is connected to the outer surface of the cover bottom wall portion. For this reason, by making the cooling air forcedly flow in the clearances between the yoke and the cover, a cooling effect on the yoke and the cover can be further enhanced.

According to a third aspect of the present invention, in addition to the first or second aspect, the bottom wall portion of the yoke and the cover bottom wall portion are connected to each other with a hub interposed therebetween, and a boss portion integrally included in the hub is connected to the crankshaft.

According to the third aspect of the present invention, the bottom wall portion of the yoke and the cover bottom wall portion are connected to each other with the hub interposed therebetween, and the boss portion integral with the hub is connected to the crankshaft. For these reasons, the yoke and the cover are connected and integrated with each other via the common hub so as to be able to be made into a sub-assembly. Accordingly, workability of attaching and detaching the yoke and the cover to and from the crankshaft is satisfactory. Furthermore, the use of the hub interposed between the yoke and the cover makes it possible to position the yoke and the cover to each other accurately and easily, and to set the clearances therebetween accurately and easily.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of a preferable embodiment of the present invention shown in the accompanying drawings.

Figure 1:
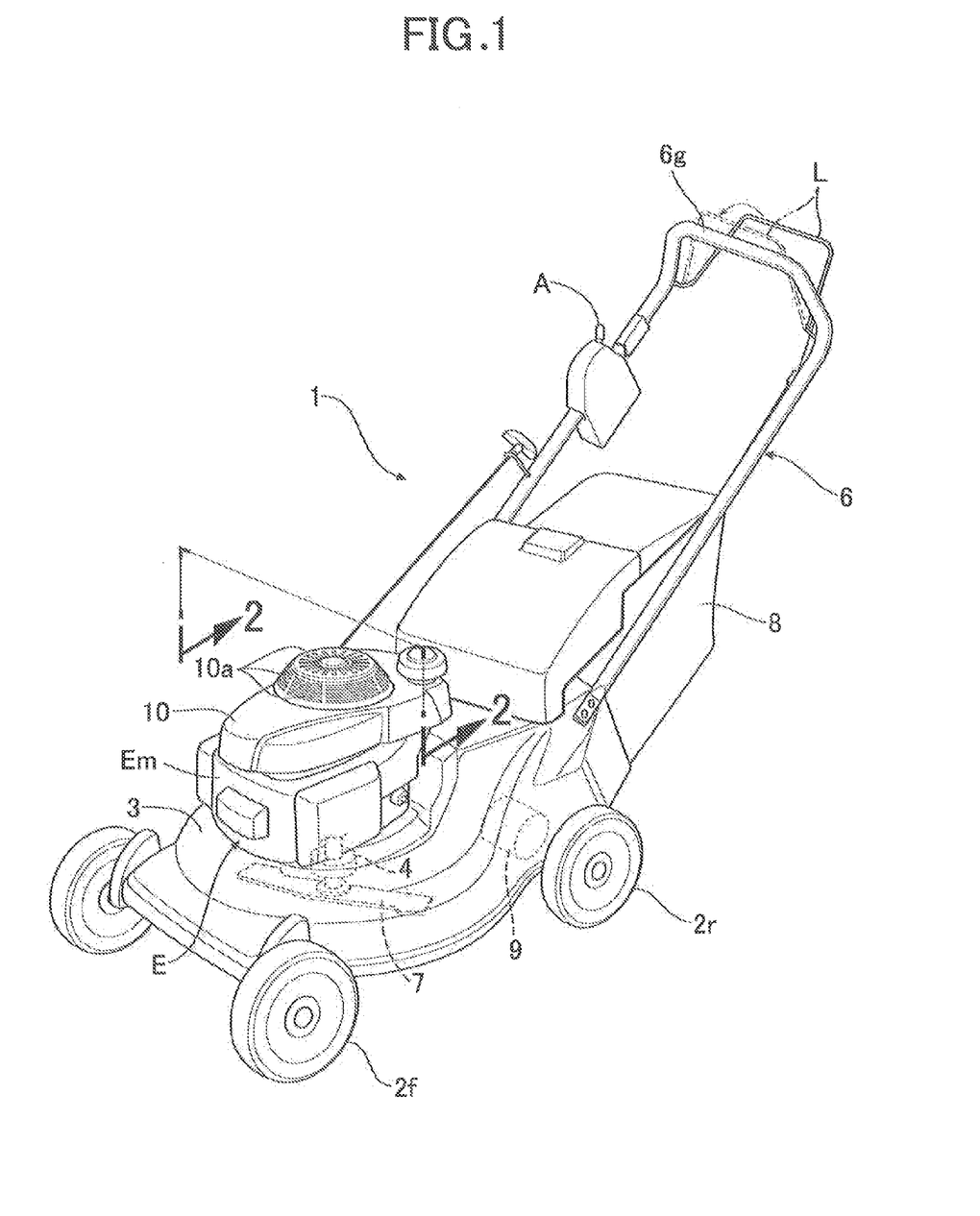
FIG. 1 is an overall perspective view of a power mower according to an embodiment of the present invention.

First of all, in FIG. 1, a walking-type power mower 1 as a power working machine includes a housing 3 having an opened lower surface and supported by front wheels 2f and rear wheels 2r. A vertical engine E having a crankshaft 5 arranged in a vertical direction is mounted on an upper portion of the housing 3. A rotary cutting blade 7 arranged inside the housing 3 is connected to a lower end of the crankshaft 5 via an electromagnetic clutch 4. A lawn bag 8 is attached to a steering handle 6 which is connected to a rear end of the housing 3 so as to extend obliquely rearward. Lawn grass cut by the cutting blade 7 is stored into the lawn bag 8. It should be noted that: in the embodiment, the rear wheels 2r are driven by a traveling motor 9; and the traveling motor 9 and a battery (not illustrated) for supplying electric power to the traveling motor 9 are placed inside the housing 3.

Figure 2:
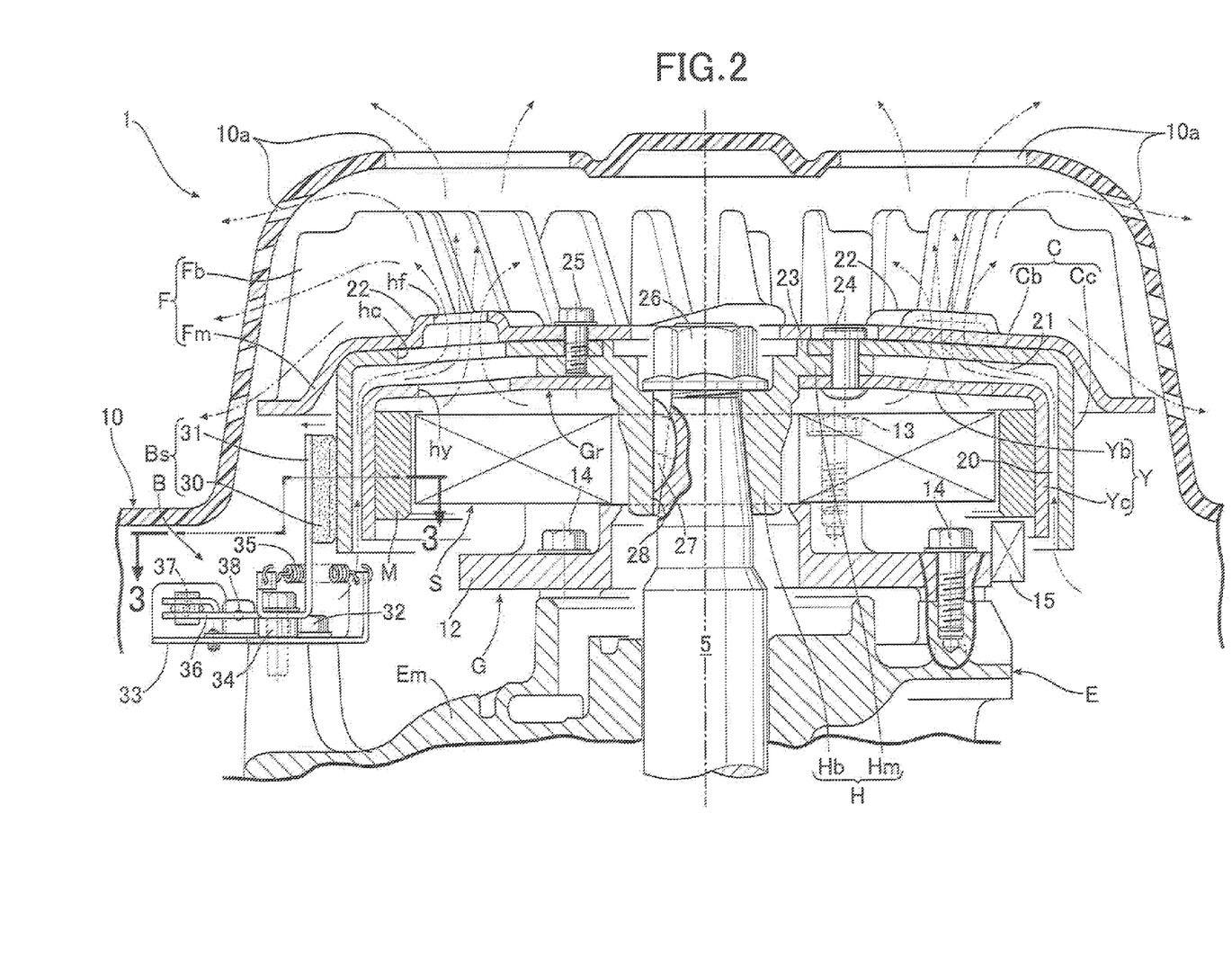
FIG. 2 is a longitudinal sectional view of a generator of the power mower and its peripheral area (an enlarged sectional view taken along a 2-2 line in FIG. 1).
Figure 3:
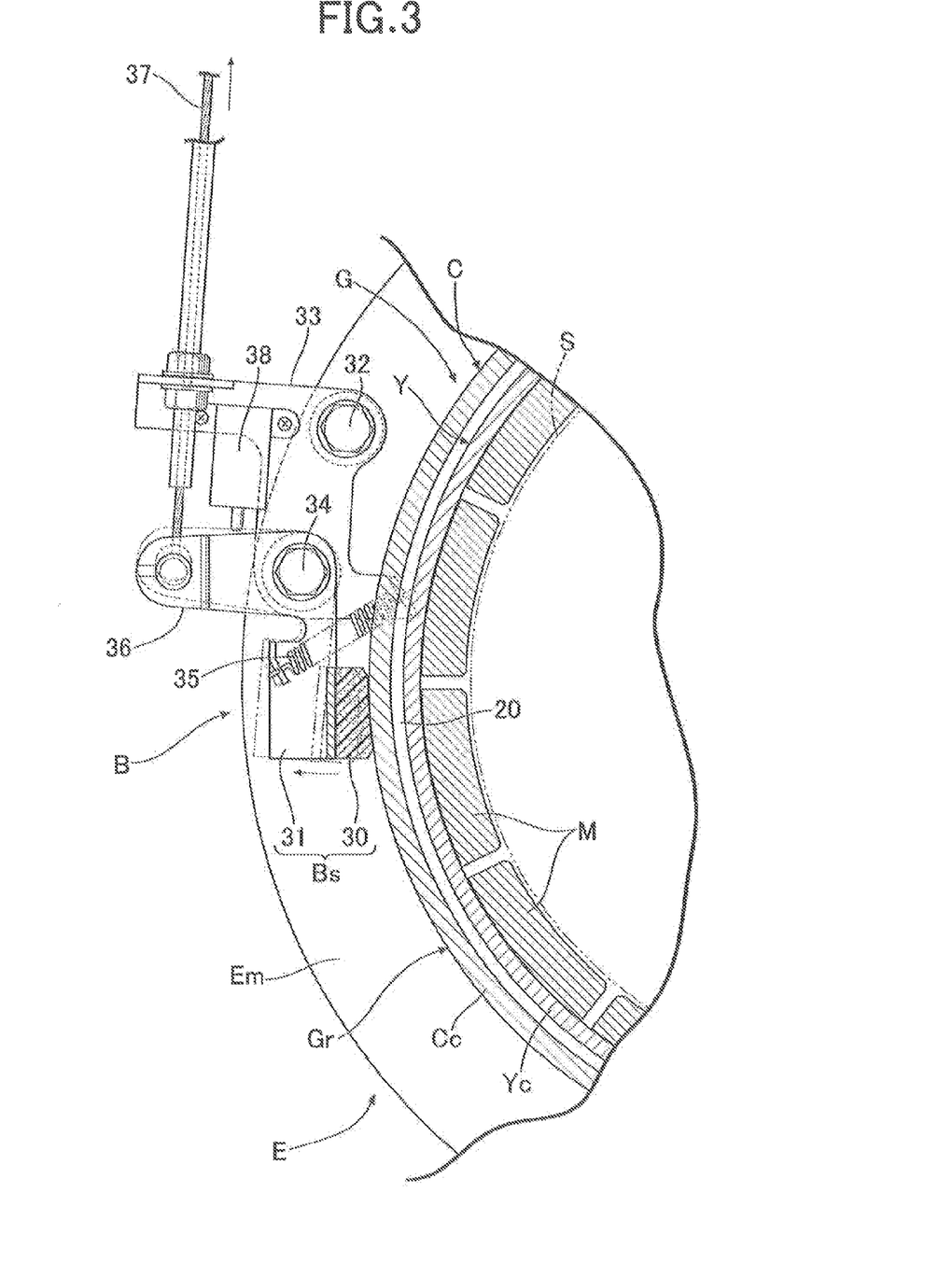
FIG. 3 is a sectional view taken along a 3-3 line in FIG. 2.
Figure 4A:
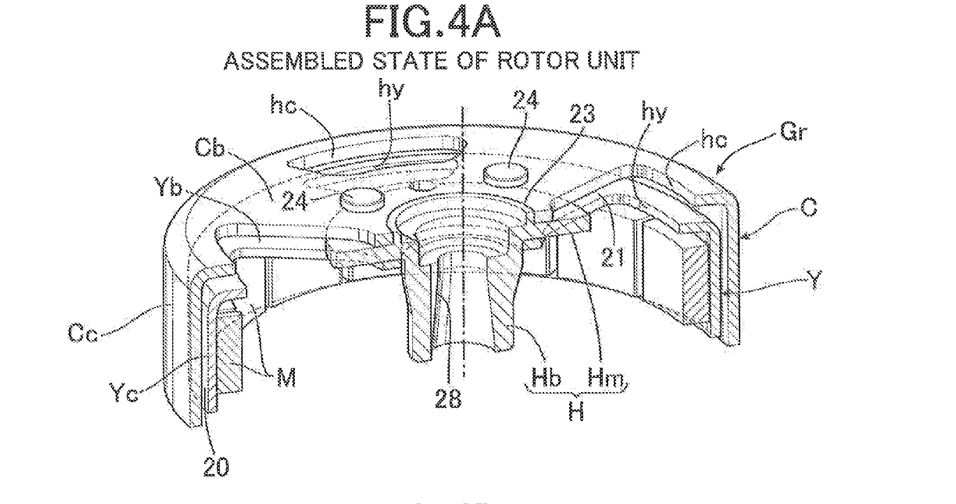
FIGS. 4A and 4B are partially cut-away perspective views of a rotor of the generator mounted on the power mower, FIG. 4A showing an assembled state of the rotor, and FIG. 4B showing a disassembled state of the rotor.
Figure 4B:
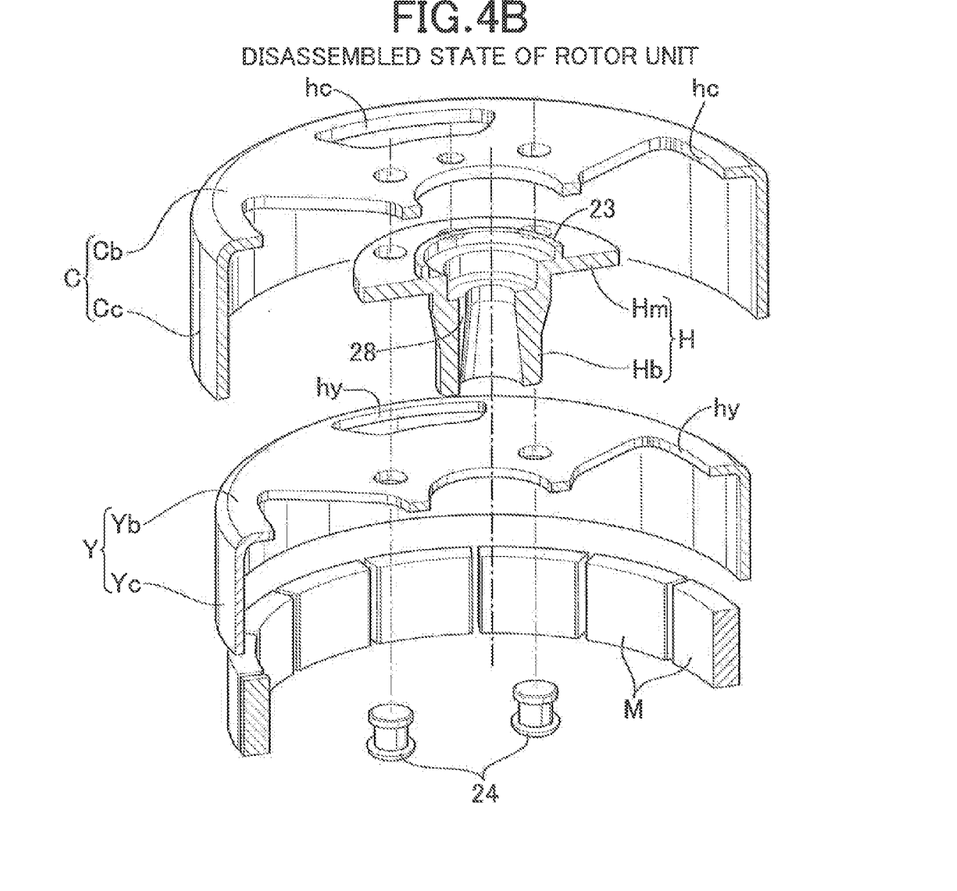

Referring to FIGS. 2 to 4 together, a rotor Gr of a generator G which also serves as a starter motor is connected to an upper end of the crankshaft 5 of the engine E. The generator G forms a rotary electric device of the present invention. Action of a control circuit connected to the generator G makes the generator G function as the starter motor only during starting operation of the engine E. While the engine E is in a normal driving state, the generator G exerts its power generating function, and generated power is stored in the battery.

A cooling fan F which also serves as a flywheel is connected to an upper portion of the rotor Gr of the generator G. An engine cover 10 covering upper portions of the cooling fan F and the engine E is fixedly attached to an engine main body Em. In addition, multiple discharge holes 10a for air, which has cooled the engine E while flowing inside the engine cover 10, are provided through an upper portion of the engine cover 10. External air inlet ports (not illustrated) for taking therethrough external air into the inside of the engine cover 10 are provided in a lower portion of the engine cover 10.

A brake mechanism B for braking the rotor Gr of the generator G (and accordingly the crankshaft 5 of the engine E) with the engine E stopped is annexed to the power mower 1. Furthermore, when the engine E is started and operated in a braking-released state of the brake mechanism B, sucking action of the cooling fan F which rotates integrally with the crankshaft 5 sucks the external air into the inside of the engine cover 10 via the external air inlet ports. The thus-sucked air cools an upper portion of the engine main body Em. Subsequently, the air passes through the inside of the generator G as indicated with dot-dashed line arrows in FIG. 2, and cools the generator G. Thereafter, the air is forcedly discharged via the discharge holes 10a in the engine cover 10.

The generator G includes: a stator S fixed to the engine main body Em; a yoke Y formed in a bottomed cylindrical shape by connecting a substantially flat bottom wall portion Yb to an upper end of a cylindrical portion Yc having a short cylindrical shape, and surrounding the stator S; multiple magnets M facing the stator S, and joined and fixed to an inner peripheral surface of the cylindrical portion Yc of the yoke Y so as to be located at intervals from one another in a peripheral direction; and a cover C having a bottomed cylindrical shape, and covering the yoke Y.

Like conventional well-known stators, the stator S has stator coils in its outer peripheral portion, and is formed in an annular shape. In addition, a stator core portion of the stator S is fixed on a stator base 12 with a bolt 13. The stator base 12 is fixed to the upper portion of the engine main body Em with a bolt 14. Furthermore, a sensor 15 for detecting rotation of the rotor Gr of the generator G is fixed to the stator base 12.

The bottom wall portion Yb of the yoke Y is connected to the crankshaft 5 of the engine E via a hub H, as described later. Incidentally, the yoke Y is made from a magnetic material. Moreover, the cover C may be made from the same material as the yoke Y, or may be made from a different magnetic material. Otherwise, the cover C may be made from a non-magnetic material.

The cover C includes [M] a cover cylindrical portion Cc concentrically surrounding an outer peripheral surface of the cylindrical portion Yc of the yoke Y with an annular clearance 20 interposed therebetween. The annular clearance 20 has a first width as seen best in FIG. 2. The cover C also includes a substantially flat cover bottom wall portion Cb continuous to an upper end of the cover cylindrical portion Cc, and faced and connected to the bottom wall portion Yb of the yoke Y. A lower end of the cover cylindrical portion Cc extends downward longer than a lower end of the yoke bottom wall portion Yb. Since like this, the cover C covers a periphery of the yoke Y in a wide range, leakage of magnetic paths can be effectively inhibited. Accordingly, sensing performance of the sensor 15 is improved.

In addition, a substantially flat ventilation clearance 21, directly communicating with the annular clearance 20, is formed between opposedly-facing surfaces of the bottom wall portion Yb of the yoke Y and the cover bottom wall portion Cb. As shown in the drawing, the ventilation clearance 21 is not less than the width of the annular clearance 20. Vent holes hy, hc communicating the ventilation clearance 21 with the outside of the yoke Y are provided through the bottom wall portion Yb of the yoke Y and the cover bottom wall portion Cb. In the depicted embodiment, particularly, in the bottom wall portion Yb of the yoke Y, the multiple vent holes hy, each formed in a fan shape, are spaced out in the peripheral direction. Meanwhile, each of the multiple vent holes hc in the cover bottom wall portion Cb is formed in a fan shape at a position overlapping the vent holes hy in the yoke bottom wall portion Yb. In addition, an opening area of each vent hole hc is set slightly larger than the opening area of each vent hole hy in the yoke bottom wall portion Yb.

The cooling fan F which also functions as the flywheel is attached on the cover bottom wall portion Cb so as to rotate integrally with the cover bottom wall portion Cb. Sucking action of the cooling fan F makes it possible for the cooling air to forcedly flow into the annular clearance 20, the ventilation clearance 21 and the vent holes hy, hc sequentially, as described later.

The cooling fan F is formed from: a fan base Fm having a substantially flat dish shape, and overlapping an upper surface of the cover bottom wall portion Cb; and multiple blade portions Fb integrally protruded from an upper surface of the fan base Fm. In addition, in the fan base Fm, each of upward bulging portions 22 is formed at a position corresponding to the vent holes hy, hc, and a vent hole hf communicating with the vent holes hy, hc is formed in an apex portion of each upward bulging portion 22 so as to pass therethrough. Next, descriptions will be provided for a structure for fixing the cooling fan F, together with the yoke Y and the cover C, to the crankshaft 5 via the hub H.

The hub H includes: a hub main body Hm having a ring plate shape and clamped between the bottom wall portion Yb of the yoke Y and the bottom wall portion Cb of the cover C so as to function as a spacer therebetween (in other words, so as to keep the ventilation clearance 21 constant); and a cylindrical boss portion Hb integrally extending downward from an inner peripheral portion of the hub main body Hm. The yoke Y and the cover C are positioned to the hub H by: fitting an inner periphery of the bottom wall portion Cb of the cover C to an annular protrusion 23 on an upper surface of the hub main body Hm; and fitting an inner periphery of the bottom wall portion Yb of the yoke Y to an upper end of an outer periphery of the boss portion Hb.

Furthermore, the bottom wall portion Yb of the yoke Y and the bottom wall portion Cb of the cover C are integrally connected together via multiple rivets 24 which penetrate through the bottom wall portions Yb, Cb and the hub main body Hm. Such combination body forms the rotor Gr of the generator G.

Moreover, the cooling fan F and the cover C are fastened to the hub H by multiple bolts 25. The bolts 25 are threadedly inserted into the hub main body Hm by penetrating through the fan base Fm and the cover bottom wall portion Cb at positions different from those of the rivets 24. In addition, the boss portion Hb of the hub H is taper-fitted to an outer periphery of an upper end portion of the crankshaft 5, and is fastened to the crankshaft 5 using a nut 26. Incidentally, conventional well-known rotation preventing means (a key 27 and a key groove 28 in the illustrated example) are provided to a fitting portion between the crankshaft 5 and the hub boss portion Hb.

Thereby, the cooling fan F, the cover C and the yoke Y are connected together, and are fixed to the crankshaft 5, via the hub H, Meanwhile, the cover C functions as a brake drum of the brake mechanism B, and a brake shoe Bs is placed in pressure contact with an outer peripheral surface of the cover cylindrical portion Cc when the brake mechanism B is operated, so that the cover C, and accordingly the crankshaft 5 are braked.

The brake shoe Bs is formed from: a lining 30 made from a friction material which is capable of being placed in pressure contact with the outer peripheral surface of the cover cylindrical portion Cc; and a shoe main body 31 fixedly supporting a back surface of the lining 30. In addition, the shoe main body 31 is pivotally supported by a support bracket 33 via a pivot axis 34, the support bracket 33 being fastened to the upper surface of the engine main body Em using a bolt 32. Thereby, the brake shoe Bs is pivotable between a brake position where the lining 30 is placed in pressure contact with the outer peripheral surface of the cover cylindrical portion Cc (a position indicated with solid lines in FIG. 3) and a brake release position where the lining 30 is separated from the outer peripheral surface thereof (a position indicated with chain lines in FIG. 3). A brake spring 35 for always elastically biasing the brake shoe Bs toward the brake position (in a counterclockwise direction in FIG. 3) is installed between the shoe main body 31 of the brake shoe Bs and the support bracket 33.

In addition, a release arm 36 is integrally formed on the shoe main body 31. A manipulation wire 37 which is pulled and operated by a brake release lever L (see FIG. 1) pivotally supported by the steering handle 6 is connected to a tip end of the arm 36. By pulling the manipulation wire 37 against the brake spring 35, it is possible to rotate the brake shoe Bs toward the brake release position via the release arm 36.

Furthermore, an engine kill switch 38 is placed on the support bracket 33. The engine kill switch 38 is such that: when the brake shoe Bs comes to the brake position, the engine kill switch 38 puts an ignition circuit (not illustrated) of the engine E out of operation in conjunction with the brake shoe Bs coming to the brake position so as to stop operation of the engine E; and while the brake shoe Bs is in the brake release position, the engine kill switch 38 makes the ignition circuit of the engine E operable in conjunction with the brake shoe Bs being in the brake release position. Incidentally, the structure and function of the engine kill switch are conventionally well-known.

Moreover, the steering handle 6 is provided with an engine lever A which is operated to start and stop the engine E and to adjust rotation speed of the engine E. In addition, the control circuit (not illustrated) connected to the generator G operates such that: only when the engine lever A is operated to start the engine E while performing the pulling operation of the brake release lever L, energization to the generator G is performed so as to make the generator G function as a starter motor; and after starting of the engine E is completed, the energization to the generator G is stopped so as to make the generator G exert its power generation function.

It should be noted that: depending on the necessity, in addition to the brake release lever L and the engine lever A, the steering handle 6 is provided with various manipulation levers for comfortably operating the mower 1 (for example, a traveling lever, a cutting blade clutch lever, and the like, the traveling lever being used for switching traveling and stopping by controlling the traveling motor 9, and the cutting blade clutch lever being used for switching rotating and stopping of the cutting blade 7 by controlling the electromagnetic clutch 4 with the engine E kept in operation). However, because such manipulation levers are unrelated to the gist of the present invention, illustrations and concrete descriptions for functions of the levers are omitted herein.

Next, descriptions will be provided for an operation of the embodiment.

When the brake release lever L is not operated with the engine E being in a stopped state, the brake shoe Bs elastically biased by the brake spring 35 stays in the brake position as indicated with the solid lines in FIGS. 2 and 3, applies braking force to the crankshaft 5 via the rotor Gr of the generator G (the cover C), and thereby keeps the engine E in the stopped state.

The first thing for an operator to do to put the power mower 1 into operation is to pull the manipulation wire 37 against the brake spring 35 by taking hold of the brake release lever L together with a grip portion 6g of the steering handle 6. This pulling operation makes the brake shoe Bs rotate to the brake release position. The brake shoe Bs accordingly releases the braking force which has been applied to the rotor Gr of the generator G. Thereby, the crankshaft 5 is set free. In this process, the engine kill switch 38 is put out of operation in conjunction with the brake shoe Bs, and the ignition circuit not illustrated of the engine E becomes operable. Thereafter, the engine E can be started by operating the engine lever A to rotate the engine lever A to the start position with the brake release lever L held in the operated state to pull the manipulation wire 37.

Subsequently, when the engine E is started, the crankshaft 5 rotationally drives the cutting blade 7 with the electromagnetic clutch 4 kept engaged. For this reason, the operator can mow the lawn by pushing the power mower 1 while keeping hold of the grip portion 6g of the steering handle 6 together with the brake release lever L. Incidentally, during the mowing work, traveling and stopping of the mower 1 using the traveling motor 9 is performed by use of the traveling lever. In addition, while keeping the engine E operating, the cutting blade 7 can be stopped by: manipulating the cutting blade clutch lever; and thereby disengaging the electromagnetic clutch 4.

When the operator releases his/her hold on the brake release lever L, which the operator has been pulling, after the work using the power mower 1, the brake shoe Bs puts the engine kill switch 38 into operation while, by the biasing force of the brake spring 35, automatically returning to the brake position where the brake shoe Bs is placed in pressure contact with the rotor Gr of the generator G (the cylindrical portion Cc of the cover C). For this reason, the crankshaft 5 is braked via the rotor Gr, and the engine E immediately stops its operation. Thereafter, the operation of the engine E is kept stopped.

As described above, the embodiment is configured as follows. The yoke Y having a bottomed cylindrical shape, of the generator G, is covered with the cover C similarly having a bottomed cylindrical shape. The cover C includes: the cover cylindrical portion Cc concentrically surrounding the outer peripheral surface of the yoke cylindrical portion Yc with the annular clearance 20 interposed therebetween, and having the outer peripheral surface with which the brake shoe Bs is capable of being placed in pressure contact; and the cover bottom wall portion Cb continuous to the upper end of the cover cylindrical portion Cc, and connected to the yoke bottom wall portion Yb. The ventilation clearance 21 communicating with the annular clearance 20 is formed between the yoke bottom wall portion Yb and the cover bottom wall portion Cb. The vent holes hy, hc communicating the ventilation clearance 21 with the outside of the yoke Y are provided through the yoke bottom wall portion Yb and the cover bottom wall portion Cb. For these reasons, even when the temperature of the cover C which functions as the brake drum is increased by friction during the braking operation, or the cover C is deformed due to braking load, influence of the heat and deformation on the yoke Y can be effectively inhibited, and deterioration in performance of the generator G can be prevented. In addition, even if the temperature of the yoke Y becomes high due to heat generated from the coils, the magnets M and the like while the generator G is operated, the heat is hardly transmitted to the cover C. For this reason, deterioration in brake performance due to operation heat of the generator G can be prevented.

Furthermore, based on the sucking action of the cooling fan F, the cooling air can be made to forcedly flow in: the clearances (the annular clearance 20 and the ventilation clearance 21) formed between the yoke Y and the cover C; and the vent holes hy, hc provided to the bottom wall portion Yb of the yoke Y and the bottom wall portion Cb of the cover C. In addition, the surface areas of the yoke Y and the cover C can be sufficiently secured as a whole. For these reasons, the yoke Y and the cover C can be effectively cooled. As a result, for example, it is unnecessary to, for example, especially provide a magnet protection cover between an inner periphery of the yoke Y and the magnets M and especially thicken the yoke Y. These lead to achievement of: cost reduction; reduction in the weight of the rotary portions of the generator G; and accordingly reduction in fuel consumption of the engine E and reduction in inertial mass of the engine E.

Besides, in the embodiment, the bottom wall portion Yb of the yoke Y and the bottom wall portion Cb of the cover C are connected to each other with the hub H interposed therebetween; the cover C and the cooling fan F are fastened together to the hub H; and the boss portion Hb integral with the hub H is connected to the crankshaft 5. For these reasons, the yoke Y, the cover C and the cooling fan F are connected and integrated with each other via the common single hub H so as to be able to be made into a sub-assembly. Accordingly, workability of attaching and detaching the yoke Y, the cover C and the cooling fan F to and from the crankshaft 5 is satisfactory. Furthermore, the use of the hub H interposed between the yoke Y and the cover C makes it possible to appropriately position the yoke Y and the cover C to each other, and to accurately set the clearances 20, 21 therebetween.

Although the foregoing descriptions have been provided for the embodiment of the present invention, the present invention is not limited to the embodiment. Various design changes can be made to the present invention within a scope not departing from the gist of the present invention.

For instance, although the embodiment has shown the generator G (sel-dynamo), which also serves as the starter motor, as an example of the rotary electric device, the present invention may be applied to a rotary electric device specialized for power generation. In a case of this application, a conventional well-known starter device (for example, a recoil-type starter, a kick-starter, a motor for exclusive use in start, or the like) is annexed to the engine E.

In addition, although the embodiment has shown the power mower as an example of the power working machine, and has described the power mower in which the cutting blade 7 is driven by the engine E mounted on the power mower, the present invention may be applied to a rotary electric device which is operatively connected to an engine used as a power source for various power working machines, other than the power mower.

Furthermore, the embodiment has described the power mower in which: by the sucking action of the cooling fan F, the external air is sucked upward from the lower portion of the engine cover 10 and then is flowed through the surrounding space of the engine E and the inside of the generator G, so as to be discharged from the upper portion of the engine cover 10. The present invention, however, may set the sucking direction of the cooling fan F vertically opposite to that in the embodiment such that: the external air is sucked into the inside of the engine cover 10 from above; the sucked air is flowed through the inside of the generator G and the surrounding space of the engine E; and the air is eventually discharged from the lower portion of the engine cover 10.

Moreover, although the embodiment has described the engine E as the vertical engine in which the crankshaft 5 is arranged vertically, the present invention may be applied to an engine in which the crankshaft is arranged horizontally.

What is claimed is:

1. A rotary electric device for a power working machine, which is operatively connected to an engine as a power source for the power working machine, and capable of being braked by a brake mechanism, the rotary electric device comprising:
   a stator fixed to an engine main body;
   a yoke including a bottom wall portion and a cylindrical portion which surrounds the stator, the yoke being formed in a bottomed cylindrical shape by connecting the bottom wall portion to one end of the cylindrical portion, and the yoke being connected to a crankshaft of the engine;
   a magnet fixedly attached to an inner peripheral surface of the cylindrical portion of the yoke, and facing the stator; and
   a cover having a bottomed cylindrical shape, and covering the yoke, wherein the cover includes:
      a cover cylindrical portion concentrically surrounding an outer peripheral surface of the cylindrical portion of the yoke with an annular clearance interposed therebetween, the annular clearance having a first width, the cover cylindrical portion having an outer peripheral surface with which a brake shoe of the brake mechanism is capable of being placed in pressure contact, and
      a cover bottom wall portion continuous to one end of the cover cylindrical portion, and connected to the bottom wall portion of the yoke,
   wherein:
      a ventilation clearance, communicating with the annular clearance, is formed between the bottom wall portion of the yoke and the cover bottom wall portion, the ventilation clearance having a width which is not less than the first width, and
      vent holes communicating the ventilation clearance with an outside of the yoke are provided through the bottom wall portion of the yoke and the cover bottom wall portion.

2. The rotary electric device for a power working machine according to claim 1, wherein a cooling fan, for making cooling air flow forcedly in the annular clearance, the ventilation clearance and the vent holes, is connected to an outer surface of the cover bottom wall portion, the fan operatively connected to the crankshaft of the engine for concurrent rotation therewith.

3. The rotary electric device for a power working machine according to claim 1, wherein the bottom wall portion of the yoke and the cover bottom wall portion are connected to each other with a hub interposed therebetween, and a boss portion integrally included in the hub is connected to the crankshaft.

4. The rotary electric device for a power working machine according to claim 2, wherein the bottom wall portion of the yoke and the cover bottom wall portion are connected to each other with a hub interposed therebetween, and a boss portion integrally included in the hub is connected to the crankshaft.

5. The rotary electric device for a power working machine according to claim 2, further comprising an engine cover fixedly attached to the engine main body for covering upper portions of the cooling fan and the engine, the engine cover having multiple discharge holes formed therein for discharging air therethrough.

6. A rotary electric device for a power working machine, which is operatively connected to an engine as a power source for the power working machine, and capable of being braked by a brake mechanism, the rotary electric device comprising:
   a stator fixed to an engine main body;
   a yoke including a substantially horizontal wall portion and a cylindrical portion which surrounds the stator, the yoke being formed in a bottomed cylindrical shape by connecting the substantially horizontal wall portion to one end of the cylindrical portion, and the yoke being connected to a crankshaft of the engine for concurrent rotation therewith;
   a magnet fixedly attached to an inner peripheral surface of the cylindrical portion of the yoke, and facing the stator;
   a cover having a bottomed cylindrical shape, and covering the yoke, wherein the cover includes:
      a cover cylindrical portion concentrically surrounding an outer peripheral surface of the cylindrical portion of the yoke with an annular clearance interposed therebetween, the annular clearance having a first width, the cover cylindrical portion having an outer peripheral surface with which a brake shoe of the brake mechanism is capable of being placed in pressure contact, and
      a substantially horizontal cover wall portion continuous to one end of the cover cylindrical portion, and connected to the substantially horizontal wall portion of the yoke for concurrent rotation therewith, and
   a cooling fan connected to an outer surface of the cover substantially horizontal wall portion, the cooling fan provided for forcing cooling air flow forcedly through the annular clearance, the ventilation clearance and the vent holes, the fan operatively connected to the crankshaft of the engine for concurrent rotation therewith, wherein:
a ventilation clearance, communicating with the annular clearance, is formed between the substantially horizontal wall portion of the yoke and the cover substantially horizontal wall portion, the ventilation clearance having a width which is not less than the first width, and
vent holes communicating the ventilation clearance with an outside of the yoke are provided through the substantially horizontal wall portion of the yoke and the substantially horizontal wall portion of the cover.

7. The rotary electric device for a power working machine according to claim 6, wherein the bottom wall portion of the yoke and the cover bottom wall portion are connected to each other with a hub interposed therebetween, and a boss portion integrally included in the hub is connected to the crankshaft.

8. The rotary electric device for a power working machine according to claim 6, further comprising an engine cover fixedly attached to the engine main body for covering upper portions of the cooling fan and the engine, the engine cover having multiple discharge holes formed therein for discharging air therethrough.

\* \* \* \* \*